April 30, 1940.    C. H. SAUER    2,198,978
RIM CONSTRUCTION
Filed Aug. 26, 1938    2 Sheets-Sheet 1
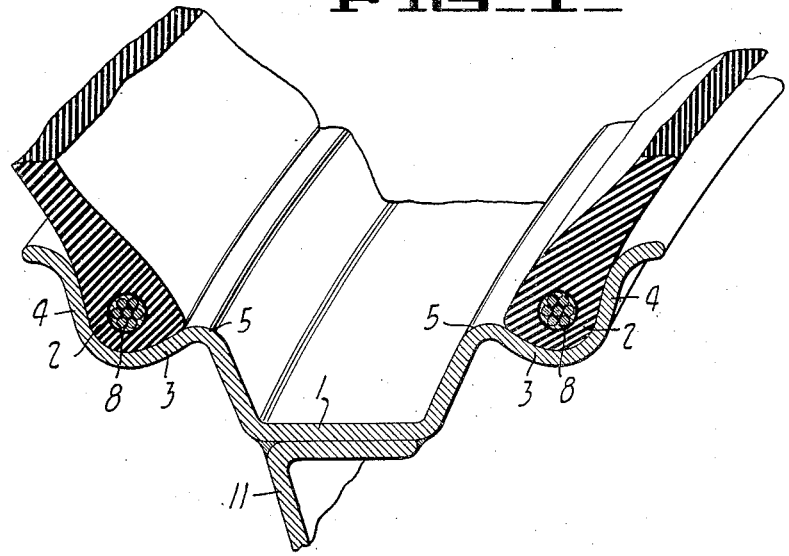
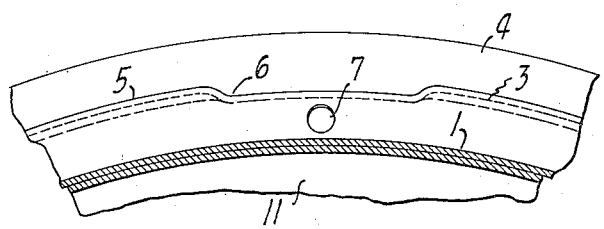
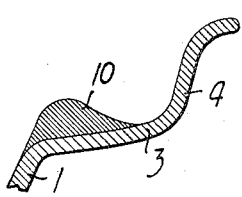
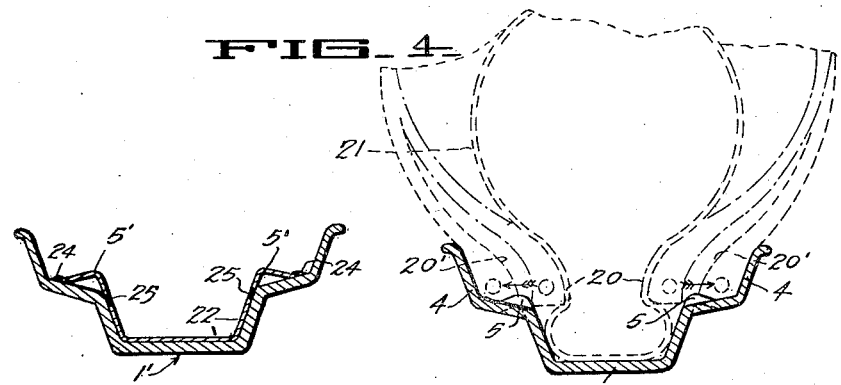
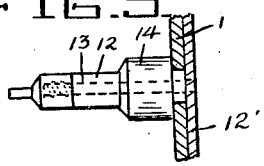
INVENTOR.
CHRIS H. SAUER
BY Boyken & Mohler
ATTORNEYS.

April 30, 1940.　　　C. H. SAUER　　　2,198,978
RIM CONSTRUCTION
Filed Aug. 26, 1938　　　2 Sheets-Sheet 2
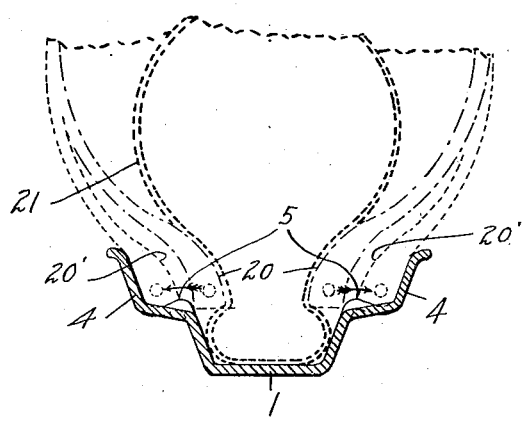
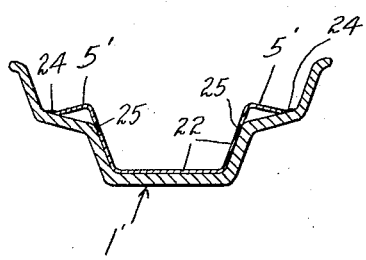
INVENTOR.
CHRIS H SAUER
BY
Boyken & Mohler
ATTORNEYS Patented Apr. 30, 1940

2,198,978

UNITED STATES PATENT OFFICE 2,198,978

RIM CONSTRUCTION

Chris H. Sauer, Chico, Calif., assignor of one-half to T. R. Rooney, Atherton, Calif.

Application August 26, 1938, Serial No. 226,914

6 Claims. (Cl. 152—381)

This invention relates to wheel and rim construction for tires and has for its objects a construction adapted to eliminate the present hazards from blow-outs in pneumatic tires on vehicles, and which construction also substantially eliminates the pinching of inner tubes at the beads and materially contributes to lessening the vibration created by the rotating wheels and rims of automobiles.

Other objects are simple and economical construction adapted to accomplish the above results without loose or detachable parts such as bolts, lugs, rings, etc.

Other objects and advantages will appear in the specification and drawings annexed hereto.

In the drawings,

Fig. 1 is a sectional view through a rim of my invention showing a tire therein, but not the tube.

Fig. 1A is a fragmentary sectional view of one side of my rim showing a modified form of the invention.

Fig. 2 is a reduced size sectional view taken centrally through a rim at the valve opening at right angles to the view of Fig. 1 showing a gap in the ridge around the rim.

Fig. 3 is a fragmentary section at the valve stem.

Fig. 4 is a sectional view of my rim at one point, with the tire and tube in dotted lines.

Fig. 5 is a sectional view of a modified form of the invention.

Briefly described, my invention contemplates a simple construction whereby a relatively light wheel and one piece continuous rim is provided, and which rim is adapted to securely lock a tire thereon so that the rim and tire will rotate as a unit irrespective of whether or not the tire is inflated, and whereby the natural forces set up in a rotating tire mounted on said rim for rotation therewith will contribute toward tightening the tire on the rim without displacement of the tire beads out of their natural position.

The elimination of bolts, rings, etc., in a one-piece, continuous rim in which the tire beads of a straight-bead type tire are securely locked in place irrespective of inflation of the tire will substantially eliminate the hazards from blow-outs in that there is no loss of control of steering by the driver upon a blow-out occurring since the only noticeable occurrence when a blow-out occurs is an initial slight drop of the injured tire after which the injured tire continues to rotate as smoothly as a tire that has merely become partially deflated. This is due to the fact that my rim is not unbalanced by the use of bolts, etc., and by the fact that there is absolutely no displacement of the tire beads relative to the rim either in a direction circumferentially of the rim or transversely thereto.

It is pertinent to note that my invention herein described does not require any changes in tire construction, but is adapted for use with ordinary straight bead tires, as distinguished from the old "clincher" type, and in which the beads are non-stretchable by reason of the wire cores in the beads.

In detail, my improved rim is in one piece and is provided with the usual outwardly opening central channel I of a width to accommodate the beads 2 of the tire for facilitating the application or removal of a tire from the rim in the usual manner, and which rims are commonly known as "drop-center" rims and are used on the majority of present automobiles. At opposite sides of the central channel I the sides of the channel project laterally outwardly at 3 to provide radially outwardly facing seats for the beads 2, and which seats carry generally radially outwardly projecting flanges 4 adapted to engage the outer sides of the beads 2 when the radially inwardly facing sides of the beads are seated on seats 3.

In conventional rims the seats 3 are either horizontal or are inclined radially outwardly relative to the outer edges of the sides of channel I and the beads are held on the seats and against the flanges 4 by internal air pressure in the inner tube within the tire. Thus, in conventional construction, when the tire is deflated, the beads are free to slip toward each other and into channel I. Also, the beads normally are relatively loose on the rim, and when the tire is deflated or even partially inflated, it requires but little force to move the tire circumferentially on the rim.

With my construction, the seats 3 are inclined radially inwardly from the outer edges of the sides of the channel I, thus providing, in general, a pair of outwardly opening channels for the beads of the tire, the juncture of the seats 3 and flanges 4 being preferably curved, as indicated in Fig. 1 and the juncture of the seats with the sides of channel I being relatively sharply curved so that the seats will drop away from the sides of the channel I substantially directly at the juncture of the seats with the channel I.

From the above construction, it will be seen that the juncture 5 of the seat 3 on each side of the rim forms a sort of ridge around the rim between the channel for the bead and the main central channel I.

The so-called ridges 5 are substantially continuous completely around the rim, but in order to facilitate seating the beads against said seats 3, these ridges may be eliminated, if desired, for a short space 6 (Fig. 2) at the point where the valve stem of the inner tube (not shown) passes through opening 7 in the side of channel 1. The outer circumference of each of the seats 3 is substantially that of the inner circumference of beads and spaces 6 are sufficient in length to permit the beads to be seated substantially against seats 3 around the circumference of the latter, with the exception of the portion of the seats between said space, whereby upon application of internal pressure, as by partial inflation of the tube, the sections of the beads extending across said spaces, respectively, will first be drawn relatively taut and will then snap across the opening in the ridges provided by said spaces and into circumferential alignment with the remainder of the beads that are seated against seats 3. The fabric covering of the wire bead cores 8 is slightly compressible, thus permitting sufficient "give" in the circumferential length of the radially inwardly disposed sides of the beads to permit this action, hence ordinarily, the spaces 6, respectively, are from about three to four inches long, and once the beads snap completely into position on seats 3, they cannot be removed, except by mechanical force applied to the outer sides of the beads at said spaces 6 and the frictional grip between the beads and seats 3 is so firm that the beads are positively locked in position on the seats against circumferential movement of the beads and seats relatively, and also the bead cores 8 are substantially centered over the lowermost portions of the bottoms of the seats 3 so that the corners of the beads along opposite side edges thereof are tightly compressed against ridges 5 and flanges 4.

When the spaces 6 are eliminated and the ridges 5 made continuous there is nevertheless sufficient "give" in the beads to cause them to snap completely into position on seat 3.

In Fig. 1A I have shown a conventional drop-center rim provided with a ring 10 welded thereto to form a seat substantially the same in contour as seat 3 in Fig. 1. This ring is substantially continuous, with the possible exception of a short section at the valve stem, when an inner tube is in the tire, to correspond to space 6 of Fig. 2.

Fig. 4 shows (dot-dash line) tube 20 with tube 21 (heavy dotted line) therein being filled with air for causing beads 2 to move over ridges 5 of the rim to position 20' (dotted line) in which the beads are tightly seated in the shallow channels at opposite sides of the large central channel. The section of the rim shown is taken at the gaps in the ridges 5.

Tube 21 is preferably of a size to closely fit against base 1, even when deflated, so as to grip the rim in case of a blow out thus tending to eliminate slippage around the rim when deflated, which slippage would tend to cause an unbalanced weight condition.

The gaps in ridges 5 are to facilitate forcing the beads into position, and from about 15 to 30 pounds air pressure is ordinarily sufficient to force the beads into frictionally locked position on the rim, but where the ridges are continuous, the tire can nevertheless be mounted by use of greater air pressure.

Fig. 5 is a cross section through an ordinary conventional "drop center rim" 1' in which I show a relatively light, substantially annular spring metal channel strip 22 seated in the central channel of the rim and formed with ridges 5' to give the same surface contour as that of ridges 5 and 10 in Figs. 1 or 1A. This strip is spot welded in place at a plurality of points 24, 25 therearound to make the strip substantially integral with the rim, thus providing a construction for converting regular rims into rims embodying my invention.

It is obvious that an appreciable lifting force is generated during the travel of the tire at relatively high speeds which, together with the inherent relative rigidity of the side walls of said tire, will not permit complete flattening of the tire when the blow-out occurs, but instead, the tire will only become slightly flattened and to a degree far less than that where there is any noticeable difficulty in steering the automobile. The letter R indicates the general axis of the path followed by point P through points $P^1$, $P^2$, $P^3$, $P^4$ during rotation of the tire over the ground.

The above is true, even where there are tire lugs, bolts, or other separated weights at points around the rim, or tire, and where the tire beads and rim are securely locked together to rotate as a unit, but vibration is excessive in such cases.

In my rim, the valve stem and opening in the rim if utilized does not create any noticeable unbalancing of the tire when the same is rolling over a surface and is deflated, and since the rim is continuous and the beads cannot become unseated, and does not creep circumferentially of the rim, there is no objectionable vibration created by any unbalancing of the tire. To reduce the objectionable vibration to a minimum, it is desirable that the rim be mounted on a central disk 11 that is welded to the rim, rather than to provide a spoke wheel, said disk being imperforate.

It is manifest that the centrifugal "lifting" force of the rotating tire and rim will tend to twist the bead, but the bead core 8 will always remain centered over the bottom of seat 3, and when the tire is deflated and there is a change in the forward directional movement of the tire, as would be caused by steering, the beads will remain seated on the rims with the bead cores over seats 3 irrespective of what changes in direction are made, and there will be no objectionable vibration, or difficulty experienced during steering to change the direction of movement of the tire.

In Fig. 3 is shown the valve stem 12 securely locked in place, in combination with my rim, since the tube 12' should be held against the tendency to bunch up in the casing in the event of a blow-out or to shift around so as to create an unbalanced weight. The stem has the conventional rubber covering with the usual tubular metal core 13, which covering is formed with an annular outer flange 14 with a shoulder 15 engaging the rim 1 to prevent withdrawal of the stem through the rim.

Having described my invention, I claim:

1. An annular rim for a pneumatic tire of the type having spaced annular beads, said rim being formed to provide a pair of spaced outwardly opening channels therearound adapted to receive therein the beads of the tire with the radially inwardly facing sides of the beads tightly seated against the bottom of the channels, the sides of said channels extending divergently from their bottoms and one of the sides of each channel being open at one point therearound to facilitate the positioning of the bead of the tire into the channel and the removal of the bead therefrom upon movement of the bead axially relative to the central axis of the rim, said rim, including the channels, being formed integrally as a single unit.

2. An unsplit single piece drop center rim and a pneumatic automobile tire having substantially inextensible spaced annular beads, said rim providing bead seats on opposite sides of its center in which said beads are seated, and ridges adjacent such center extending radially outward beyond the bottom of the bead seats for maintaining said beads, when the tire is deflated, from inadvertent displacement into the rim center.

3. In an unsplit single piece drop center rim and a pneumatic automobile tire having spaced annular beads, the combination of bead seats on opposite sides of said center in which said beads are seated, and ridges between said bead seats and center, said ridges extending radially outward beyond the bottom of such bead seats for maintaining said beads, when the tire is deflated, from inadvertent displacement into the rim center.

4. A continuous unsplit drop center rim and a pneumatic automobile tire having substantially inextensible, relatively rigid bead portions, said center being of a width sufficient to receive the two bead portions of such tire, circumferential seats on both sides of said center receiving the entire bead portions of the tire, and means extending radially outward above the bottom of such seats for preventing the bead portions of the tire from entering said center when the tire is accidentally deflated.

5. A continuous unsplit drop center rim and a pneumatic automobile tire having substantially inextensible, relatively rigid bead portions, said center being flat bottomed and of a width sufficient to receive the two bead portions of such tire, circumferential seats on both sides of said center receiving the entire bead portions of the tire, and substantially continuous ridges on both sides of said center well extending radially outward above the bottom of such seats engaging the adjacent edges of said bead portions for preventing the bead portions of the tire from entering said center when the tire is accidentally deflated.

6. A continuous unsplit drop center rim and a pneumatic automobile tire having substantially inextensible, relatively rigid bead portions, said center being flat bottomed and of a width sufficient to receive the two bead portions of such tire, circumferential seats on both sides of said center receiving the entire bead portions of the tire, and ridges of uniform length and equally distant from corresponding walls of such drop center extending radially outward above the bottom of such seats for preventing the bead portions of the tire from entering said center when the tire is accidentally deflated.

CHRIS H. SAUER.

CERTIFICATE OF CORRECTION.

Patent No. 2,198,978. April 30, 1940.

CHRIS H. SAUER.

It is hereby certified that error appears in the above numbered patent requiring correction as follows: In the heading to the drawings, Sheet 1, line 3, strike out "2 Sheets-Sheet 1"; and strike out entire Sheet 2, containing Figures 5 and 6; and that the said Letters Patent should be read with this correction therein that the same may conform to the record of the case in the Patent Office.

Signed and sealed this 11th day of June, A. D. 1940.

(Seal)

Henry Van Arsdale,
Acting Commissioner of Patents.